(12) United States Patent
Onodera

(10) Patent No.: US 6,206,029 B1
(45) Date of Patent: Mar. 27, 2001

(54) VALVE OF VACUUM APPARATUS

(75) Inventor: Koichi Onodera, Chigasaki (JP)

(73) Assignee: Shinkuseiko Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/326,705

(22) Filed: Jun. 7, 1999

(30) Foreign Application Priority Data

Jun. 8, 1998 (JP) .................................................. 10-159466

(51) Int. Cl.$^7$ ..................................................... F16K 49/00
(52) U.S. Cl. .......................... 137/334; 251/248; 251/161; 251/129.11; 251/56; 392/474
(58) Field of Search ............... 251/161, 129.11, 251/248, 56; 392/474

(56) References Cited

U.S. PATENT DOCUMENTS

| | | |
|---|---|---|
| 1,790,304 | 1/1931 | Lincoln . |
| 2,472,525 * | 6/1949 | Edwards ................................. 251/56 |
| 2,591,031 * | 4/1952 | Volpin et al. .......................... 251/161 |
| 3,882,884 * | 5/1975 | Leopold, Jr. et al. ................. 137/327 |
| 3,908,959 * | 9/1975 | Fichtner ............................ 251/129.11 |
| 4,156,437 * | 5/1979 | Chivens et al. ....................... 137/554 |
| 4,192,482 * | 3/1980 | Goldman et al. ........................ 251/56 |
| 4,231,545 * | 11/1980 | Nelimarkka ........................... 251/161 |
| 4,253,640 * | 3/1981 | Priese et al. ............................ 251/56 |
| 4,572,333 * | 2/1986 | Westley ............................... 185/40 R |
| 4,619,283 * | 10/1986 | Schoeneweis et al. ................. 137/15 |
| 4,770,202 * | 9/1988 | Webb et al. ........................... 137/242 |
| 4,976,403 * | 12/1990 | Bramblet ............................... 251/214 |
| 5,009,388 * | 4/1991 | Pei-gi et al. ............................ 251/65 |
| 5,485,542 * | 1/1996 | Ericson ................................. 392/474 |

FOREIGN PATENT DOCUMENTS

| | | |
|---|---|---|
| 352 617 | 4/1922 | (DE) . |
| 2 298 024 | 8/1996 | (DE) . |
| 93 761 | 5/1959 | (NL) . |

* cited by examiner

*Primary Examiner*—John Rivell
*Assistant Examiner*—Thomas L. McShane
(74) *Attorney, Agent, or Firm*—Young & Thompson

(57) ABSTRACT

A valve of a vacuum apparatus with a valve seat body having left and right communicating openings opposed to the two vacuum chambers, respectively, a valve body movable in the axial direction of the valve seat body and rotatable around the center axis thereof, and a driving section for moving the valve body in the axial direction of the valve seat body and for rotating it around the center axis thereof, the valve being so disposed between the left and right vacuum chambers that the driving section of the valve is projected outwardly in the horizontal (lateral) direction.

7 Claims, 6 Drawing Sheets

VALVE OF VACUUM APPARATUS

BACKGROUND OF THE INVENTION

1. Field of the Invention

The present invention relates to the valve of a vacuum apparatus which is provided between both left and right vacuum chambers which open and close an opening therebetween.

2. Description of the Related Art

Generally, the valve of a vacuum apparatus which is used for producing semiconductors, etc., to open and close vacuum chambers is shown in FIG. 1. In between right and left vacuum chambers 80 and 81, a valve $V_0$ is provided vertically. This valve $V_0$ has a casing C, in which a valve body 86 is accommodated movably in its upper and lower directions. The valve body 86 is formed in a plate-like shape and fixed at the upper end of a valve shaft 84.

The valve shaft 84 slides in a seal $S_0$ and a bellows 85 is formed between the seal $S_0$ and the upper end of the valve shaft 84 to maintain a vacuum state in the casing C while the valve shaft 84 slides. A driving section (not shown) is formed under the valve shaft 84 so that the valve body 86 moves up and down to open and close the communicating aperture 82 of the casing C.

However, in the valve $V_0$ of the vacuum apparatus, since the bellows 85 which is placed inside a communicating space $S_1$ of both vacuum chambers 80 and 81 is expanded and shrunken in a vacuum situation, life span of the bellows 85 is short and harmful particles are generated. Moreover, a plate type of valve body is used in the valve $V_0$, and therefore it can only seal one side of the vacuum chamber 80. Furthermore, there is a problem that the working space is limited to make difficult maintenance work for the driving section because the valve $V_0$ is fitted vertically in between the two vacuum chambers 80 and 81 with the driving section being positioned under the two chambers.

SUMMARY OF THE INVENTION

An object of the present invention is therefore to provide a valve of a vacuum apparatus which has seal parts o n its bo th sides without a bellows in which fewer particles are generated to ensure a long life-span and which facilitates maintenance work for the valve, especially the driving section thereof.

This and other objects can be achieved according to the present invention by providing a valve of a vacuum apparatus as disclosed hereinafter.

A valve of a vacuum apparatus provided between left and right vacuum chambers for opening and closing chamber openings thereof, comprises:

- a valve seat body disposed between said left and right chambers and having left and right communicating openings communicating with said chamber openings;
- a valve body arranged in said valve seat body so as to rotate around its center axis and to move in an axial direction of said valve seat body in order to open and close said communicating openings by adjusting its rotary position; and
- a driving section for moving said valve body in an axial direction of said valve seat body and for rotating it around its center axis.

In order to attain the aforementioned objects, the valve is fitted between two left and right vacuum chambers. The valve of the vacuum apparatus is provided in a valve seat body having a valve path which communicates with the chamber openings of the vacuum chambers. Also, the valve has a valve body which rotates freely inside the valve seat body along its center axis, and moves in the axial direction of the valve seat body so as to open and close the communicating openings by controlling the position of rotation of the valve body. Furthermore, a driving section for moving the valve body in the axial direction thereof and for rotating it around its center axis is also formed in the valve.

The above-mentioned structure of the valve of a vacuum apparatus may make it possible to open and close freely the openings of left and right vacuum chambers. This structure will lessen harmful particles to ensure a longer life span. Also, if the valve is fitted horizontally between left and right chambers, maintenance work will become remarkably easier.

The nature and further features of the present invention will be made clear from the following descriptions made with reference to the accompanying drawings.

DETAILED DESCRIPTION OF THE PREFERRED EMBODIMENTS

Two preferred embodiments of the present invention will be described hereunder with reference to the accompanying drawings.

Figure 1:
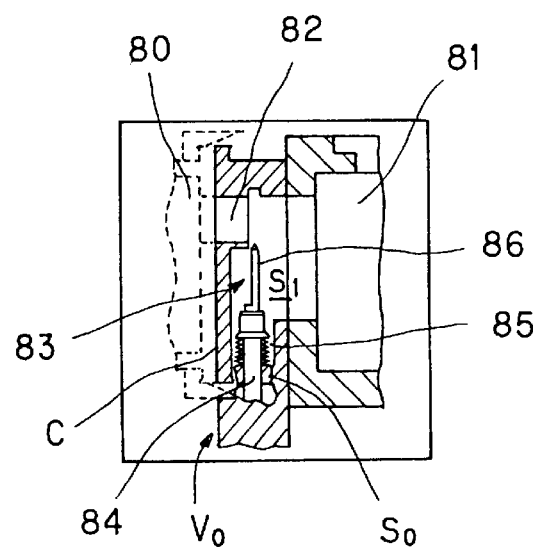
FIG. 1 is a conventional general structure view of the valve of a vacuum apparatus.
Figure 2:
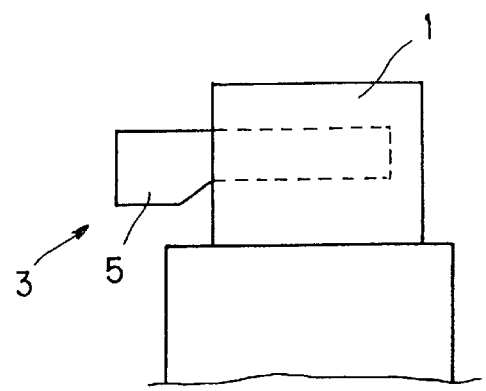
FIG. 2 is a side view of a vacuum chamber which shows the arrangement of the valve of the vacuum apparatus of the present invention.
Figure 3:
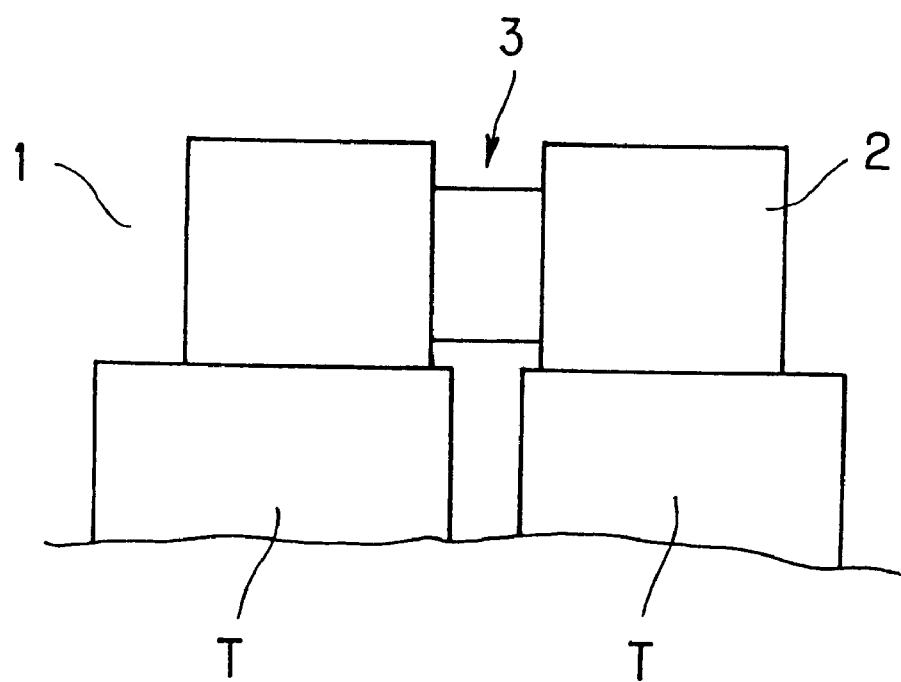
FIG. 3 is a front view of a vacuum chamber which shows the arrangement of the valve of the vacuum apparatus of the present invention.

In FIGS. 2 and 3, a vacuum apparatus has two left and right vacuum chambers 1 and 2 which are supported on two left and right stands T and T and a valve 3 according to this invention is arranged laterally (horizontally) between the two chambers 1 and 2. A driving section 5 is provided laterally, at the end portion of the valve 3, in a projected manner from the chambers 1 and 2. In this manner, if the driving section 5 is projected laterally, it would be easier to perform maintenance work for the driving section 5 which needs more maintenance work than other parts of the valve 3.

Figure 4:
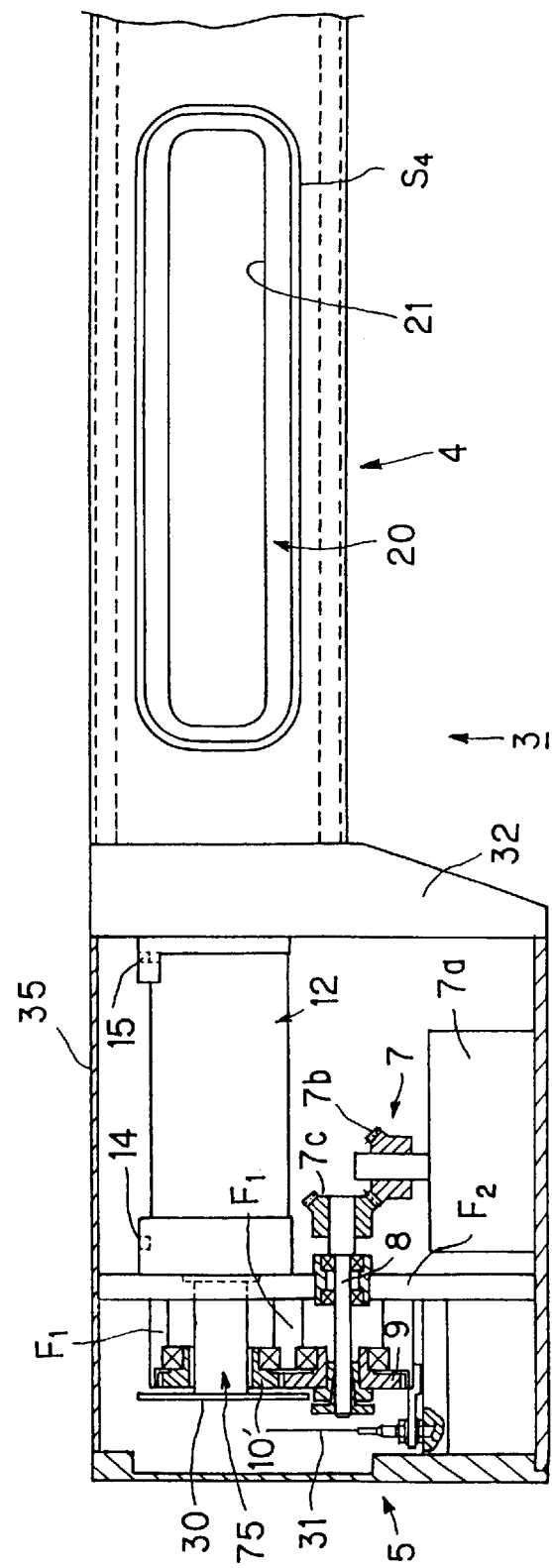
FIG. 4 is a side view with a partial cross section which shows the inside structure of the valve of the vacuum apparatus of the present invention.
Figure 5:
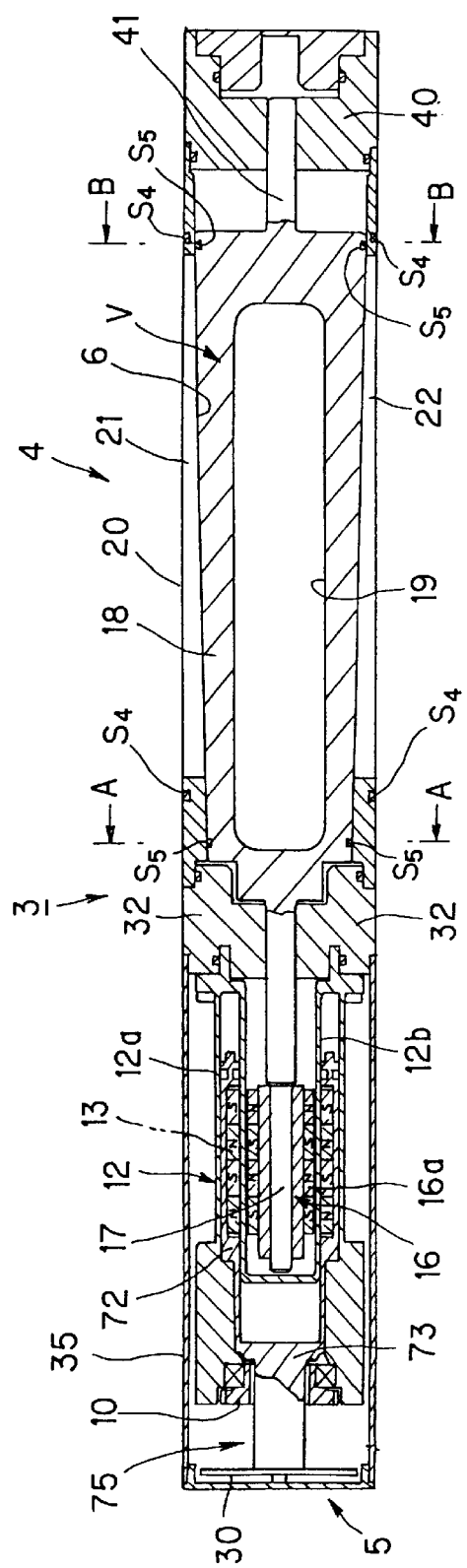
FIG. 5 is a plan view with a partial cross section which shows the upper part of the inside structure of the valve of the vacuum apparatus of the present invention.

As shown in FIGS. 4 and 5, the valve 3 has a valve section 4 which accommodates a valve body V and the driving section 5 which is connected to the valve section 4 to drive the valve body V.

Figure 6:
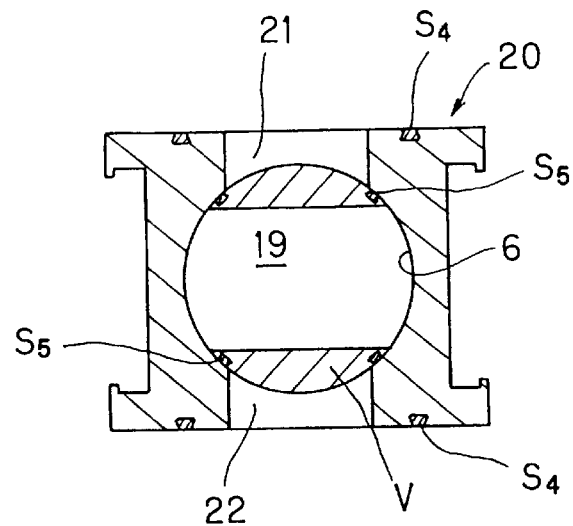
FIG. 6 is a cross section taken along the line A—A in FIG. 5.

The valve section 4 comprises, as shown in FIGS. 5 and 6, a valve seat body 20 (valve box 20) which has a rectangular cylinder shape for accommodating the valve body V. The valve seat body 20 has two left and right communicating openings 21 and 22 opposed to two openings of left and right vacuum chambers 1 and 2 and a valve accommodating room 6 which has a circular shape in section and the diameter of which is expanded continuously from the driving section 5 to the distal end of the valve section 4 to form a truncated conical shape.

Further, the two communicating openings 21 and 22 have a slender and rectangular shape on the side walls of the valve seat body 20, respectively. Each of two O-ring seals S4 and S4 is fixed in a groove formed on the outer surface of the side wall of the valve seat body along the edge of each of the communicating openings 21 and 22 in order to ensure a tight contact between the outer surface of each side wall of the valve seat body 20 and the end face of each of the left and right vacuum chambers.

The valve body forms nearly a column (truncated cone with a loosely slanted outer surface), the outer circumferential surface as an outer shape of which or the diameter of which is expanded continuously from the driving section 5 to the distal end of the valve section 4 so as to correspond to the valve body accommodating room 6 and has a valve path 19 passing through the column in the direction of the diameter thereof. The width of the valve path 19 corresponds to that of each of communicating openings 21 and 22. Further, two seals S5 and S5 are respectively provided on the outer circumferential surface of the valve body V along the open opposite ends of the valve path 19. The valve seat body 20 is closed, at its distal end, by a closing body 40 which supports, at its center portion, a guide axis 41 projected from the distal end of the valve body V so that the valve body V is rotatable around its center axis and movable in its axial direction.

Figure 7:
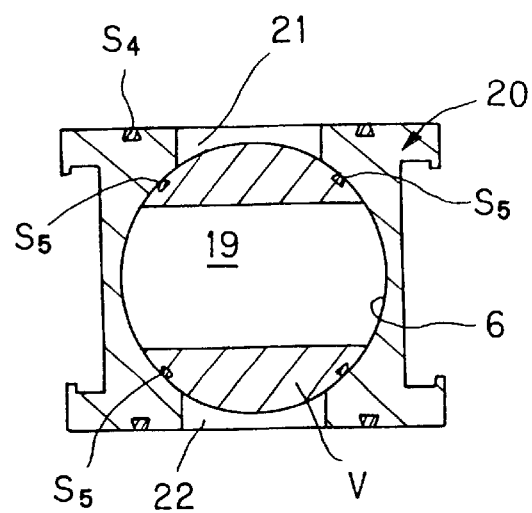
FIG. 7 is a cross section taken along the line B—B in FIG. 5.

The valve body V is driven by the driving section 5 so as to rotate around its center axis and slide in its axial direction. FIG. 5 shows a state in which the communicating openings 21 and 22 of the valve seat body 20 are closed. In this state, the open opposite ends of the valve path 19 are closed by the inner surface of the valve accommodating room 6 of the valve seat body 20 as shown in FIGS. 6 and 7. On the contrary, the communicating openings 21 and 22 of the valve seat body 20 are closed by the outer circumferential surface of the valve body V. In order to open the communicating openings 21 and 22 from this state, the valve body V is slid in the right direction in FIG. 5 to release a tight contact between the seals S5 of the valve body V and the inner wall of the valve accommodating room 6 of the valve seat body 20, and the valve body V is then rotated by 90 degrees from the position shown in FIGS. 6 and 7 to oppose the both end openings of the valve path 19 to the communicating openings 21 and 22, respectively.

On the contrary, in order to close the communicating openings 21 and 22, the valve body V is rotated by 90 degrees from its opening state in a state wherein the seals S5 on the valve body V loosely contact the inner wall of the valve accommodating room 6, and the valve body V is then moved in the left direction in FIG. 5 to touch tightly the seal S5 of the valve V to the inner wall of the valve body accommodating room 6. In this manner, the vacuum chambers 1 and 2 are tightly closed.

The mechanism of the driving section 5 for rotating the valve body V along its center axis and for moving it in its axial direction will now be explained.

In FIGS. 5 and 6, the driving section 5 has a casing 35, on the side of the valve section 4 of which a partition frame 32 is provided, and a valve axis 17 is extended through the partition frame 32 to rotatably support the valve body V. The distal end of the valve axis 17 has a plurality of ring-like magnets 16a, 16a . . . 16a in which an N-pole magnet is adjacent to an S-pole magnet to form a piston 16 which slides in a double cylinder 12 in its axial direction and rotates therein. The double cylinder 12 comprises an outer cylinder 12a and an inner cylinder 12b. A plurality of ring-like magnets 13, 13 . . . 13 in which an N-pole magnet is adjacent to an S-pole magnet are accommodated between the outer and inner cylinders 12a and 12b so that those magnets 13 and 16a form a magnet coupling. The ring-like magnets 13 are fixed at the cylindrical portion 72 of a cylindrical piston body 75, and the cylindrical portion 72 is connected integrally to its axis portion 73 and exists in the double cylinder 12. At the end of the axis portion 73 is provided an operating plate 30 for cooperating with a limit switch 31. The position of the cylindrical piston body 75 in the axial direction of the valve 3 is adjusted by controlling air supply from two air inlets 14 and 15 provided at the both ends of the double cylinder 12 as shown in FIG. 4. At the time of air supply control, the piston 16 of the valve axis 17 is moved to drive the valve body V so that each magnet 13 of the cylindrical piston body is opposed to each magnet 16a of the valve axis 17.

The cylindrical piston body 75 has the axis portion 73, at its back end, with which a driving gear 10 rotatably supported by three frames F1, F1 and F2 is spline-engaged, and an intermediate gear 9 is engaged with the driving gear 10. The intermediate gear 9 is fixed at the back end of a gear axis 8 rotatably supported by the frame F2, and an air-operating rotary actuator 7 is connected to the front end of the gear axis 8. The rotary actuator 7 comprises a rotary driving section 7a, a first bevel gear 7b fixed to the driving axis of the rotary driving section 7a, and a second bevel gear 7c is meshed with the first bevel gear 7b and fixed to the gear axis 8. The above gears 7b, 7c, 9, 10, etc., form a rotary gear mechanism for rotating the cylindrical piston body 75. When the rotary actuator 7 is driven, the cylindrical piston body 75 is rotated to rotate the piston 16 fixed to the valve axis 17.

When the communicating openings 21 and 22 of the valve seat body 20 are opened, air is supplied to the interior of the double cylinder 12 from the air inlet 14 provided at the back portion of the cylinder 12 shown in FIG. 4 to move the cylindrical piston body 75 in the right direction from the state shown in FIG. 5, so that the piston 16 of the valve axis 17 moves to the right because each magnet 13 in the double cylinder 12 attracts each magnet 16a on the piston 16. This movement moves the valve body V to the right. Then, the air-operated rotary actuator 7 is driven to rotate by 90 degrees the cylindrical piston body 75, so that the piston 16 of the valve axis is rotated by 90 degrees to open the communicating openings 21 and 22 of the valve seat body 20. When the communicating openings 21 and 22 are closed, first, the rotary actuator 7 is operated to rotate by 90 degrees the valve body V, and then, air is supplied therein from the air inlet 15 on the side of the valve section 4 of the double cylinder to operate the double cylinder 12 to move the valve body V in its axial direction.

Next, other embodiments of this invention will be explained.

Figure 8:
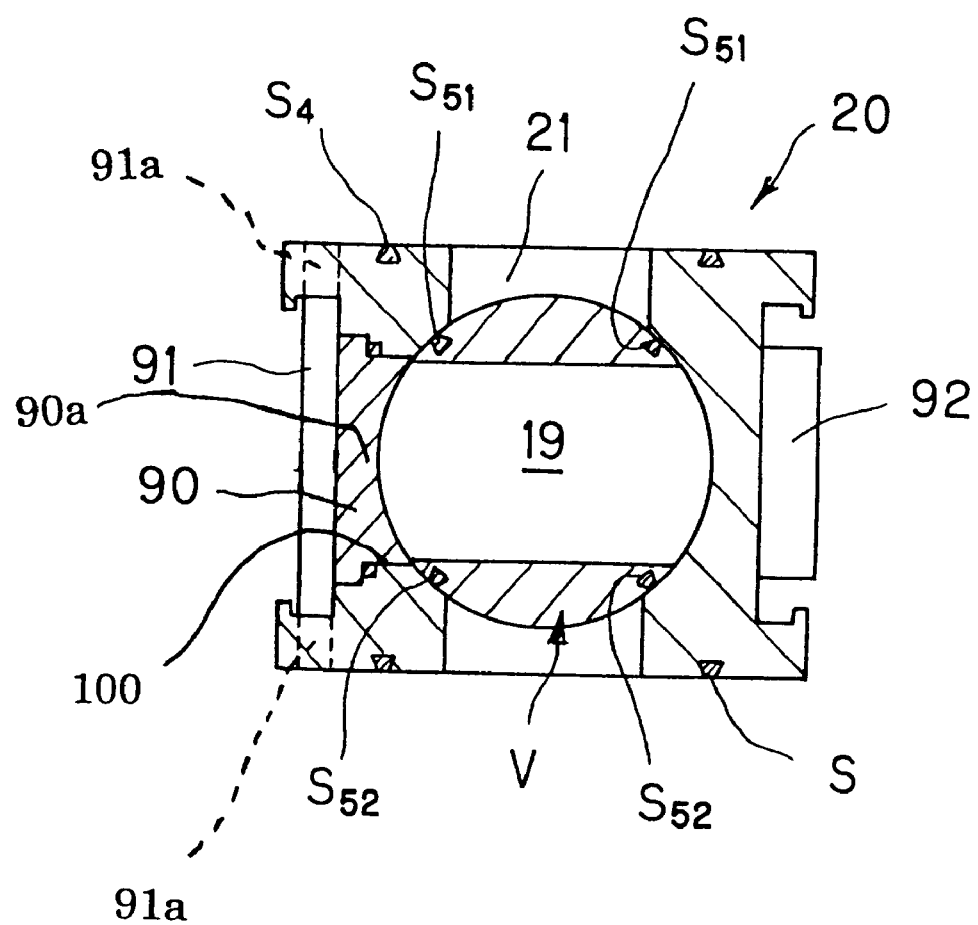
FIG. 8 is a cross section of a valve according to another embodiment of the present invention in a state of use.

As shown in FIGS. 4 and 5, a pair of seal ring S5 and S5 are arranged on the outer circumferential of the valve body V, and those seal rings must be replaced by new ones after the use of a predetermined time of span. A detachable cover 90 may be provided, as shown in FIG. 8, which shows the cross section of the valve section in a state wherein the valve section is laid down. The cover 90 has a predetermined width and length to be able to replace the old seal rings S5 and S5 with new ones on the valve body V.

In FIG. 8, the cover 90 is engaged tightly and detachably with an opening 100 provided in the upper wall of the valve seat body. The cover 90 is held by a plurality of cramp bars 90, 90 . . . 90, each of which is fixed to the upper wall of the valve seat body 20 in such a manner that the both ends 91$a$, 91$a$ of the cramp bar 91 are fastened by screws (not shown) in the projected portions on the both sides of the upper wall of the valve seat body. At the time of replacement of the seal rings S5 and S5, first, each cramp bar 91 is taken out of the upper wall of the valve seat body 20 by loosening the screws for fastening both ends of each cramp bar 91 onto the upper wall, and then, the cover 90 is taken out. Next, while the valve body V is rotated to oppose the seal ring S5 to the opening 100 of the upper wall, which is opened after the cover 90 is taken out to take out the seal ring S51.

Further, the valve body V is rotated in the reverse direction to oppose the seal ring S52 to the opening 100 of the upper wall in order that the seal ring S52 can be taken out. After these seal rings S51 and S52 are taken out, two new seal rings are put into the grooves for accommodating the seal rings. The cover 90 may be provided on the lower wall of the valve seat body 20.

Furthermore, the temperature of these seal rings S51 and S52 is generally low temperature. Therefore, if there is a large differences in temperature between the outer circumferential surface of the valve body V and the inner walls of the valve seat body 20, chemical materials are generated in the form of powdered harmful particles by a chemical reaction on the surfaces of the seal rings S51 and S52. The generation of the harmful particles shortens the life span of the seal rings S51 and S52. In order to solve this problem, a heat source 92 such as a halogen lamp and other heating lamps may be arranged on the lower wall of the valve seat body 20 to adjust the temperature of the whole portion of the valve 3 at 80° C. to 280° C., preferably 250° C. by preheating before the vacuum apparatus is operated.

In addition, the cover 90 may have a service port 90$a$ through which a nozzle for making a vacuum in the valve seat body 20 or a measuring device for detecting the temperature and the level of vacuum in the valve seat body 20. The valve seat body 20 and the valve body V may be made of stainless steel, aluminum, ceramics or titan.

In this invention, the magnet coupling is used instead of the bellows, the valve can be used for a long time with little particles, and since sealing surfaces are provided on both side faces of the valve seat body 20, the valve seat body 20 can be tightly arranged between the two vacuum chambers. If the valve is arranged between the two vacuum chambers in the lateral direction, the driving section is projected in the horizontal direction from the vacuum apparatus to facilitate the maintenance work for the driving section.

What is claimed is:

1. A valve of a vacuum apparatus provided between left and right chambers for opening and closing chamber openings thereof, which comprises:

a valve seat body disposed between said left and right chambers and having left and right communicating openings communicating with said chamber openings, said valve seat body having a valve accommodating room;

a valve body arranged in said valve accommodating room so as to rotate around its center axis and to move in an axial direction of said valve seat body so as to ensure a tight contact between an outer surface of the valve body and an inner surface of the valve accommodating room and to release the tight contact therebetween in order to open and close said communicating openings by adjusting its rotary position; and a driving section for moving said valve body in an axial direction of said valve seat body and for rotating it around its center axis, wherein said driving section comprises a sliding magnetic actuator with a first ring-like magnet moving the valve body by magnetic coupling to a second ring-like magnet during rotary and axial movement.

2. A valve according to claim 1, wherein said valve is disposed laterally in said left and right vacuum chambers so that said driving section of said valve is projected laterally from said vacuum chambers.

3. A valve according to claim 1, wherein the diameter of the valve accommodating room changes continuously and the cross section thereof is circular, and the communicating openings are located on the side walls thereof, said valve body forming an almost column body having a conical surface, the diameter of which changes continuously, said valve body having a valve path passing through said almost column body in the diametric direction of said valve body in such a manner that said valve path is open at its opposite ends.

4. A valve of a vacuum apparatus provided between left and right vacuum chambers for opening and closing chamber openings thereof, which comprises:

a valve seat body disposed between said left and right chambers and having left and right communicating openings communicating with said chamber openings, said valve seat body having a valve accommodating room;

a valve body arranged in said valve accommodating room so as to rotate around its center axis and to move in an axial direction of said valve seat body so as to ensure a tight contact between an outer surface of the valve body and an inner surface of the valve accommodating room and to release the tight contact therebetween in order to open and close said communicating openings by adjusting its rotary position; and a driving section for moving said valve body in an axial direction of said valve seat body and for rotating it around its center axis, wherein said driving section comprises a double cylinder having inner and outer cylinders, a cylindrical piston body having a first ring-like magnet between said inner and outer cylinders and sliding in its axial direction therebetween, a piston accommodated in said inner cylinder so as to be fixed on said valve body and having a second ring-like magnet corresponding to said first ring-like magnet in said double cylinder, and a rotary gear mechanism for rotating said cylindrical piston body, said first and second ring-like magnets forming a magnet coupling, so that the valve body is moved in its axial direction and rotated around its axis in accordance with the movement and rotation of the cylindrical piston body.

5. A valve according to claim 1, wherein said valve seat body has a cover detachably provided thereon to open said valve accommodating room.

6. A valve according to claim 5, wherein said cover has a service port for inserting various devices into said valve seat body.

7. A valve according to claim 1, wherein a heat source is provided on said valve seat body for preheating it.

* * * * *